C. WALLESVERD.
HARROW ATTACHMENT.
APPLICATION FILED FEB. 8, 1919.

1,314,292. Patented Aug. 26, 1919.

INVENTOR:
Carl Wallesverd
BY his ATTORNEY
A.M. Carlsen.

UNITED STATES PATENT OFFICE.

CARL WALLESVERD, OF HERSEY, WISCONSIN.

HARROW ATTACHMENT.

1,314,292.  Specification of Letters Patent.  Patented Aug. 26, 1919.

Application filed February 8, 1919. Serial No. 275,828.

*To all whom it may concern:*

Be it known that I, CARL WALLESVERD, a citizen of the United States, residing at Hersey, in the county of St. Croix and State of Wisconsin, have invented a new and useful Harrow Attachment, of which the following is a specification.

My invention relates to attachments for harrows, especially for disk harrows. The main object is to preserve the moisture in the plowed and harrowed soil by mulching and smoothing down the top of the soil by a suitable device as soon as the harrow has passed over it. A second object is to so construct the smoothing attachment that it will not drag together weeds and roots of any kind. A third object is to so construct the attachment that it may easily be attached to any ordinary disk harrow and will also be adjustable to harrows of different sizes, and will be changeable as to its form.

Figure 1:
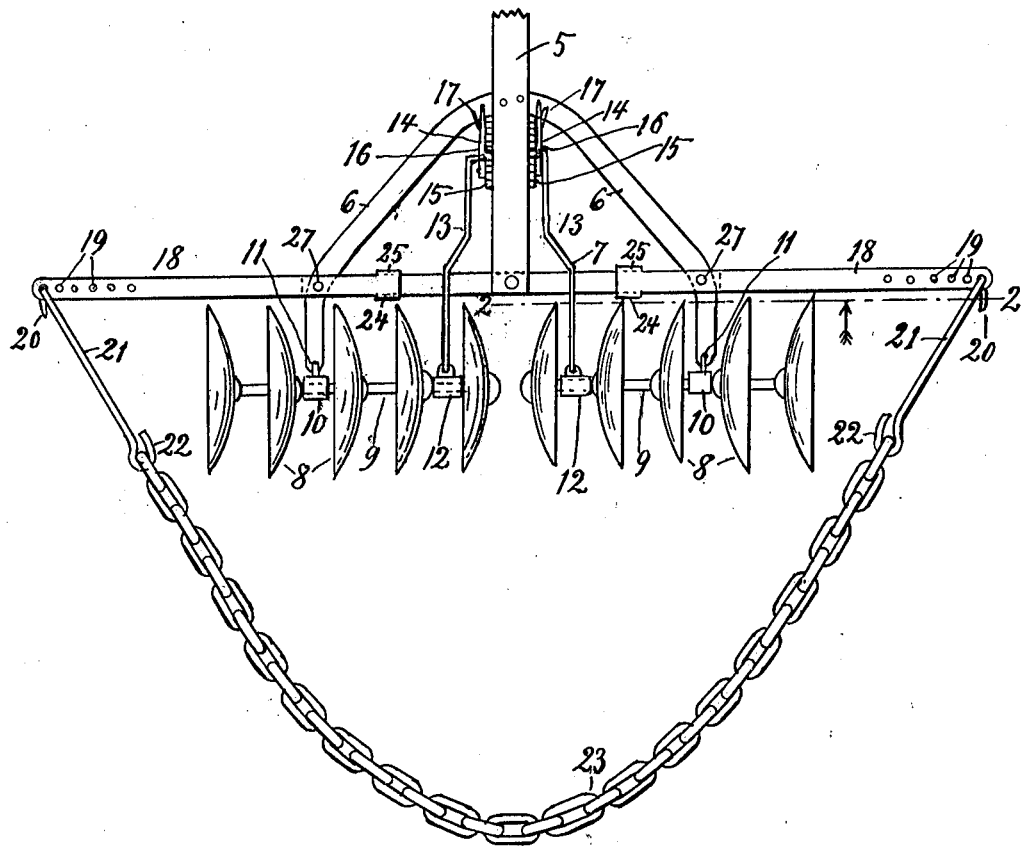
Figures 3, 4:
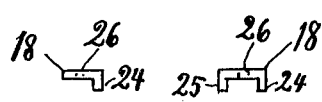
Figure 2:
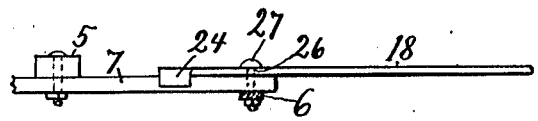

In the accompanying drawing, Figure 1 is a top view of a disk harrow equipped with my attachment. Fig. 2 is a section on the line 2—2 in Fig. 1. Fig. 3 is a left hand end view of the bar 18 in Fig. 2. Fig. 4 is a modification of Fig. 3.

Referring to the drawing by reference numerals, 5 designates the pole and 6 the usual frame of a disk-harrow, whose disks 8 are mounted on shafts 9, the latter being journaled in boxes 10, which are pivotally attached at 11 to the frame arms 6 and carry each a collar 12, which by a rod 13 is connected to a hand lever 14; the latter is fulcrumed to a notched sector 15, which it engages by means of a dog 16, controlled by a finger lever 17.

My attachment comprises two extension bars 18, having each in its outer end a series of holes 19, in either of which may be placed the hook 20 of a rod 21; said rod having its rearward end formed with a hook 22 which engages one end of a heavy chain 23, which when the harrow is in forward motion forms a parabolic curve, about as shown in Fig. 1, rearward of the disks.

The inner ends of the bars 18 are each formed with either two lugs, 24—25, or the lug 24 only, as in Fig. 4, and a short distance from said lugs the bar is provided with a hole 26. Said hole is placed on the regular bolt 27 that holds the ends of bar 7 to the arched bar 6 of the frame. If said regular bolt is not long enough to receive also the bar 18, it is simply removed and a slightly longer bolt substituted.

In the operation of the harrow and the attachment, the lugs 24 resist all rearward strain on the bars 18, so that if the bolt 27 is drawn tight the lug 25 may be dispensed with and thereby some material and labor saved, but if both lugs, 24 and 25 are used, one in rear and the other in front of the frame bar 7, it will be impossible to swing the bar 18 on the bolt in any direction even if the bar should hit some object in turning to the right or left with the harrow.

If the harrow be an extra small one the hooks 20 may be moved into holes 19 farther in on the bars 18, and any link near the ends of the chain may be placed upon the hooks 22. The rods 21 are to save chain where the latter could not reach the ground and work the surface thereof.

The chain may ordinarily be of about three-fourths of an inch iron with about five links to the running foot; but this may be modified according to the size of the harrow and the character of the soil, for which reason the chain is detachable from the hooks, 22, so it may be substituted by a lighter or heavier chain when so desired.

When the harrow is in operation the chain pulverizes and smooths down the top of the soil behind the harrow as it moves forward.

What I claim is:—

1. The combination with the frame of a harrow, of two opposite transverse laterally extending bars secured to the harrow frame and having their outer ends provided with apertures, a slack chain dragged in segmental form in rear of the harrow and having its ends attached one to each of the apertured bars, said bars having several apertures each, and the ends of the chain being provided with hooks adapted to engage in either of the apertures.

2. The structure specified in claim 1, said hooks being each formed at one end of a rod having its rear end attached to the chain.

3. The structure specified in claim 2, said rods having at their rear ends hooks detachably engaged with the chain.

4. The structure specified in claim 1, said lateral bars having near their inner ends holes arranged to register with certain bolts in the ordinary harrow frame.

5. The structure specified in claim 4, and one or more lugs at the end of each bar for engagement with the harrow frame to prevent swinging of the bar on the bolt when only one bolt is used in each bar.

In testimony whereof I affix my signature.

CARL WALLESVERD.